(12) United States Patent
Wang et al.

(10) Patent No.: US 10,969,539 B2
(45) Date of Patent: Apr. 6, 2021

(54) LED LIGHT STRIP AND BACKLIGHT MODULE HAVING THE SAME

(71) Applicants: BOE TECHNOLOGY GROUP CO., LTD., Beijing (CN); Hefei BOE Optoelectronics Technology Co., Ltd., Anhui (CN)

(72) Inventors: Rui Wang, Beijing (CN); Hongchao He, Beijing (CN); Wei Lei, Beijing (CN); Jiang Zhu, Beijing (CN); Liangliang Zheng, Beijing (CN); Qiulan Dong, Beijing (CN); Yuxi Dong, Beijing (CN)

(73) Assignees: BOE TECHNOLOGY GROUP CO., LTD., Beijing (CN); HEFEI BOE OPTOELECTRONICS TECHNOLOGY CO., LTD, Anhui (CN)

( * ) Notice: Subject to any disclaimer, the term of this patent is extended or adjusted under 35 U.S.C. 154(b) by 415 days.

(21) Appl. No.: 15/768,898

(22) PCT Filed: Sep. 30, 2017

(86) PCT No.: PCT/CN2017/104736
§ 371 (c)(1),
(2) Date: Apr. 17, 2018

(87) PCT Pub. No.: WO2018/166184
PCT Pub. Date: Sep. 20, 2018

(65) Prior Publication Data
US 2020/0241196 A1     Jul. 30, 2020

(30) Foreign Application Priority Data
Mar. 13, 2017 (CN) .......................... 201710146587.0

(51) Int. Cl.
F21V 8/00     (2006.01)
G02F 1/13357  (2006.01)

(52) U.S. Cl.
CPC ........... G02B 6/0091 (2013.01); G02B 6/002 (2013.01); G02B 6/009 (2013.01); G02B 6/0013 (2013.01);
(Continued)

(58) Field of Classification Search
CPC .... G02B 6/0091; G02B 6/002; G02B 6/0031; G02F 1/133603; G02F 1/133608
See application file for complete search history.

(56) References Cited

U.S. PATENT DOCUMENTS 7,847,306 B2 * 12/2010 Feng ..................... H01L 33/483
                                                   257/98
7,997,784 B2 *  8/2011 Tsai ..................... G02B 6/0068
                                                   362/621
(Continued)

FOREIGN PATENT DOCUMENTS

CN      1553258 A      12/2004
CN    101126867 A       2/2008
(Continued)

OTHER PUBLICATIONS

International Search Report and Written Opinion from PCT/CN2017/104736 dated Dec. 28, 2017.
(Continued)

*Primary Examiner* — Arman B Fallahkhair
(74) *Attorney, Agent, or Firm* — Calfee, Halter & Griswold LLP (57) ABSTRACT

The present disclosure provides an LED light strip and a backlight module having the same. The LED light strip includes a circuit board; the circuit board has a board body and a support structure disposed on a surface of the board
(Continued)

body; a plurality of LED light emitting elements are disposed on the support structure, the plurality of the LED light emitting elements are arranged in a plurality of rows and face to a first direction parallel to the board body; the arrangement direction of each row of the LED light emitting elements is a second direction that is parallel to the board body and perpendicular to the first direction; and the orthographic projections of the LED light emitting elements on a plane that is parallel to the second direction and perpendicular to the first direction are staggered from each other.

11 Claims, 3 Drawing Sheets

(52) U.S. Cl.
CPC ......... *G02B 6/0031* (2013.01); *G02B 6/0068* (2013.01); *G02F 1/133603* (2013.01); *G02F 1/133608* (2013.01); *G02B 6/0073* (2013.01); *G02B 6/0083* (2013.01)

(56) References Cited

U.S. PATENT DOCUMENTS

| | | | | |
|---|---|---|---|---|
| 8,426,877 | B2* | 4/2013 | Zhang | G02B 6/0018 257/88 |
| 9,588,280 | B2* | 3/2017 | Im | G02B 6/0068 |
| 2009/0135592 | A1* | 5/2009 | Hamada | H01L 25/0753 362/231 |

FOREIGN PATENT DOCUMENTS

| | | |
|---|---|---|
| CN | 201017141 Y | 2/2008 |
| CN | 101477271 A | 7/2009 |
| CN | 201269435 Y | 7/2009 |
| CN | 101680633 A | 3/2010 |
| CN | 101846267 A | 9/2010 |
| CN | 202001958 U | 10/2011 |
| CN | 202327843 U | 7/2012 |
| CN | 202598330 U | 12/2012 |
| CN | 102865499 A | 1/2013 |
| CN | 202791674 U | 3/2013 |
| CN | 103047610 A | 4/2013 |
| CN | 103048727 A | 4/2013 |
| CN | 103453383 A | 12/2013 |
| CN | 104216170 A | 12/2014 |
| CN | 105258027 A | 1/2016 |
| CN | 205263341 U | 5/2016 |
| CN | 205842379 U | 12/2016 |
| CN | 205880450 U | 1/2017 |
| CN | 106597745 A | 4/2017 |
| CN | 106908994 A | 6/2017 |
| JP | 2009117206 A | 5/2009 |
| WO | 00/49332 A1 | 8/2000 |

OTHER PUBLICATIONS

First Office Action for Chinese Patent Application No. 201710146587.0 dated Jul. 2, 2019.

* cited by examiner

LED LIGHT STRIP AND BACKLIGHT MODULE HAVING THE SAME

CROSS REFERENCE

The present application is based upon International Application No. PCT/CN2017/104736, filed on Sep. 30, 2017, which claims the priority of Chinese Patent Application No. 201710146587.0, filed on Mar. 13, 2017, and the entire contents thereof are incorporated herein by reference.

TECHNICAL FIELD

The present disclosure relates to an LED device, in particular, to an LED light strip and a backlight module having the same.

BACKGROUND

The design trend of LCD devices is to be more highlighted and lightened, however, there is a conflict in design between lightening and highlighting of existing LCD devices. For example, the lightened LED device has limited spaces therein, which cannot accommodate large number of LED light emitting devices, while highlighted LED device requires larger number of LED light emitting devices to provide sufficient brightness.

It should be noted that, information disclosed in the above background portion is provided only for better understanding of the background of the present disclosure, and thus it may contain information that does not form the prior art known by those ordinary skilled in the art.

SUMMARY

According to an aspect of the present disclosure, there is provided an LED light strip including a circuit board which having a board body and a support structure disposed on a surface of the board body. A plurality of LED light emitting elements are disposed on the support structure, the plurality of the LED light emitting elements are arranged in a plurality of rows and face to a first direction parallel to the board body, the arrangement direction of each row of the LED light emitting elements is a second direction that is parallel to the board body and perpendicular to the first direction, and the orthographic projections of the LED light emitting elements on a plane that is parallel to the second direction and perpendicular to the first direction are staggered from each other.

According to an embodiment of the present disclosure, for two adjacent rows of the LED light emitting elements among the plurality of the rows of the LED light emitting elements, the height of the LED light emitting elements in the relatively rear row in the first direction is higher than the height of the LED light emitting elements in the relatively front row in the first direction.

According to an embodiment of the present disclosure, the support structure includes a plurality of support parts disposed on the board body and arranged in a plurality of rows, each support part is provided with at least one LED light emitting element; the height of the support parts in the relatively rear row in the first direction is higher than the height of the support parts in the relatively front adjacent row in the first direction; and the height of the LED light emitting elements disposed on the support parts in the higher row is higher than the height of the support parts in the adjacent lower row.

According to an embodiment of the present disclosure, the support parts in each row are evenly spaced in the second direction.

According to an embodiment of the present disclosure, the support structure is arranged in a stepped shape and is disposed with a plurality of arrangement surfaces that are perpendicular to the board body and the first direction; each arrangement surface is disposed with at least one row of the LED light emitting elements; and the height of the relatively rear arrangement surface in the first direction is higher than the height of the arrangement surface in the relatively front adjacent row in the first direction.

According to an embodiment of the present disclosure, the LED light emitting elements on each arrangement surface are evenly spaced in the second direction.

According to another aspect of the present disclosure, there is provided a backlight module including a light guide plate and an LED light strip disposed on a light incident side of the light guide plate. The light incident side of the light guide plate corresponds to a plurality of rows of the LED light emitting elements of the LED light strip.

According to an embodiment of the present disclosure, the light incident side of the light guide plate is disposed with a plurality of light guide surfaces corresponding to and cooperating with the plurality of the rows of the LED light emitting elements respectively.

According to an embodiment of the present disclosure, the LED light emitting elements are arranged in two rows, the height of the LED light emitting elements in the relatively rear row in the first direction is higher than the height of the LED light emitting elements in the relatively front row in the first direction; the light incident side of the light guide plate is disposed with a stepped groove and two light guide surfaces, and the two light guide surfaces correspond to and cooperate with the two rows of the LED light emitting elements respectively.

According to an embodiment of the present disclosure, a reflection sheet is provided between the two light guide surfaces, and the reflection sheet is located on top of the groove.

It is to be understood that both the foregoing general description and the following detailed description are exemplary and explanatory only and are not restrictive of the disclosure, as claimed.

This section provides a summary of various implementations or examples of the technology described in the disclosure, and is not a comprehensive disclosure of the full scope or all features of the disclosed technology.

BRIEF DESCRIPTION OF THE DRAWINGS

The various objects, features, and advantages of the present disclosure will become more apparent from the following detailed description of the preferred embodiments of the present disclosure with reference to the appended drawings. The drawings are merely exemplary illustration of the present disclosure and are not necessarily drawn to scale. In the drawings, the same reference numerals denote the same or similar components throughout. Where.

DETAILED DESCRIPTION

Exemplary embodiments that embody the features and advantages of the present disclosure will be described in detail in the following description. It should be understood that the present disclosure may have various changes in various embodiments without departing from the scope of the present disclosure, and that the description and drawings herein are by way of illustration in nature and not intended to limit the present disclosure.

In the following description of various exemplary embodiments of the present disclosure, reference is made to the accompanying drawings that constitute a part of the present disclosure and in which show, by way of examples, various exemplary structures, systems and steps which may implement various aspects of the present disclosure. It is appreciated that other specific aspects of the components, structures, exemplary devices, systems, and steps may be used and structural and functional modifications may be made without departing from the scope of the present disclosure. Also, although the terms "between", "side", and the like may be used herein to describe various exemplary features and elements of the present disclosure, these terms are used herein for convenience only, for example, in accordance with the example direction as shown in the accompanying drawings. Nothing in this specification should be construed as that it does not fall within the scope of the present disclosure unless requiring a specific three dimensional orientation of structures.

Figure 1:
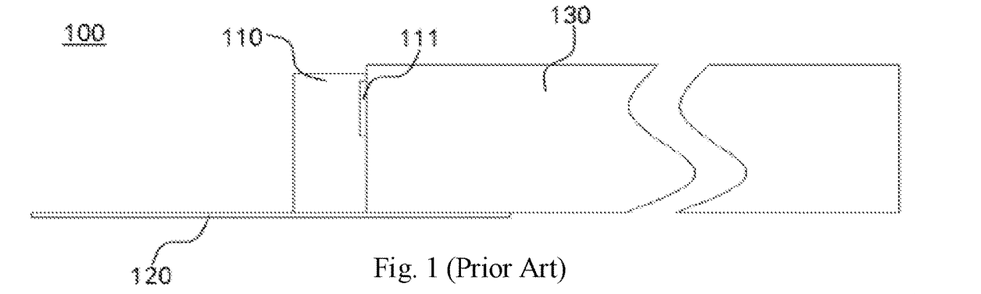
FIG. 1 is a side view of an LED module according to a comparison embodiment.
Figure 2:
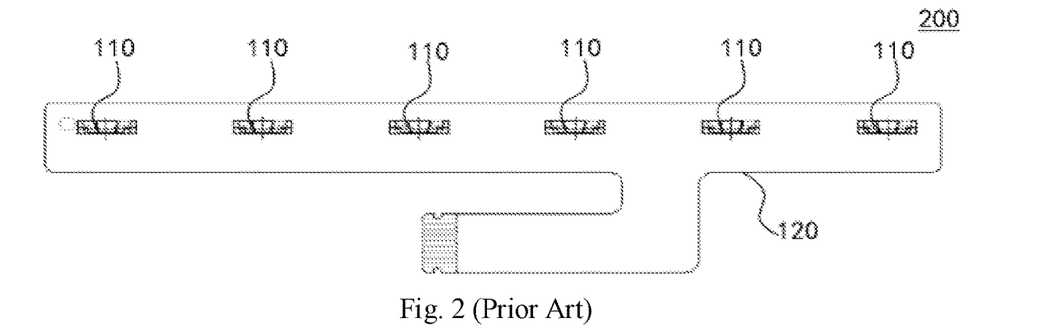
FIG. 2 is a top view illustrating an LED light strip of the LED module as shown in FIG. 1.
Figure 3:
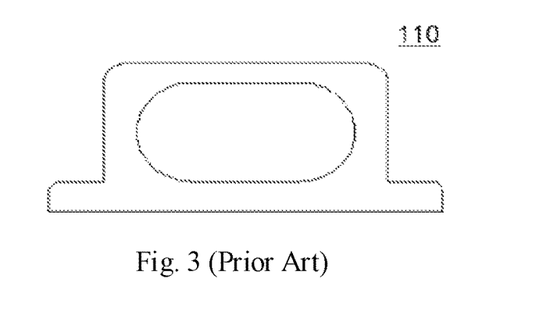
FIG. 3 is a schematic diagram illustrating a structure for the support structure and the LED light emitting element of the LED module as shown in FIG. 1.

Hereinafter, an example embodiment of an LED light strip according to a comparison embodiment is illustrated with reference to FIGS. 1 to 3. As shown in FIGS. 1 to 3, FIG. 1 shows a side view of a conventional LED module 100, FIG. 2 shows a top view of the LED light strip of the LED module 100, and FIG. 3 shows the structural schematic diagram of the support structures 110 and the LED light emitting elements 111 of the LED module 100. In the LED module 100, the support structures 110 are spaced and disposed on the circuit board 120 in a row. The light incident side of the light guide plate 130 corresponds to the LED light emitting elements 111 provided on the support structure 110 and cooperates with the LED light strip. Due to the limitation on the structure and the space, the type and number of the support structures 110 and the LED light emitting elements 111 are limited, and it is difficult to achieve the effect of increasing the luminance of an LED device while lightening the LED device. Furthermore, based on the wiring on the LED light strip, the number of LED light emitting elements 111 cannot be too large, and the number of LED light emitting elements is small, which may cause the HOT SPOT problem. The AP value may become bottleneck for increasing the luminance.

Figure 4:
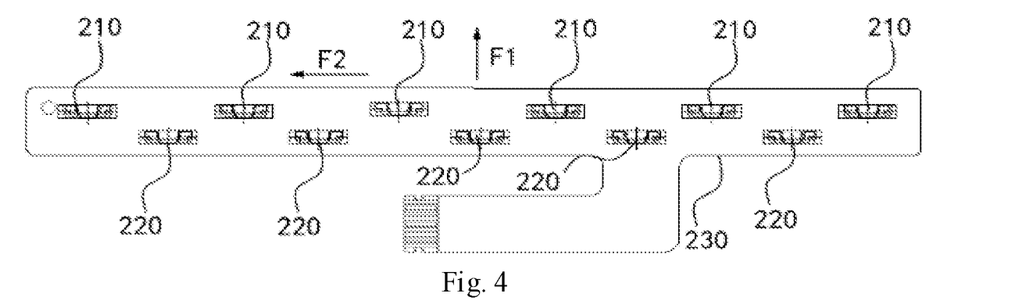
FIG. 4 is a top view illustrating an LED light strip according to an exemplary embodiment.

Referring to FIG. 4, FIG. 4 representatively shows a top view illustrating an LED light strip 200 that can embody the principle of the present disclosure. In the exemplary embodiment, The LED light strip 200 provide by the present disclosure is exemplified by a backlight module, particularly, by a backlight module with the LED light strip 200 and a light guide plate 300, for illustration. It is easy to understand for those skilled in the art that, in order to apply the LED light strip 200 to other devices, various modifications, additions, substitutions, deletions, or other changes are made to the following specific embodiments, and these changes still fall within the scope of the principle of the LED light strip 200 provided by the present disclosure.

Figure 5:
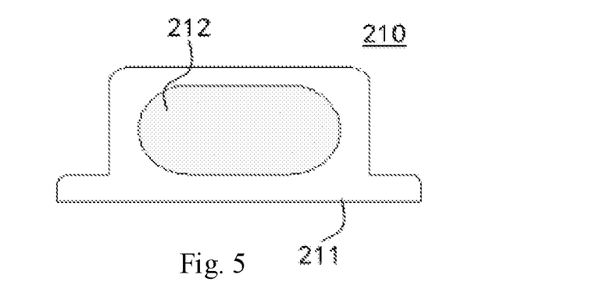
FIG. 5 is a schematic diagram illustrating a structure for the first support part and an LED light emitting element of the LED light strip as shown in FIG. 4.
Figure 6:
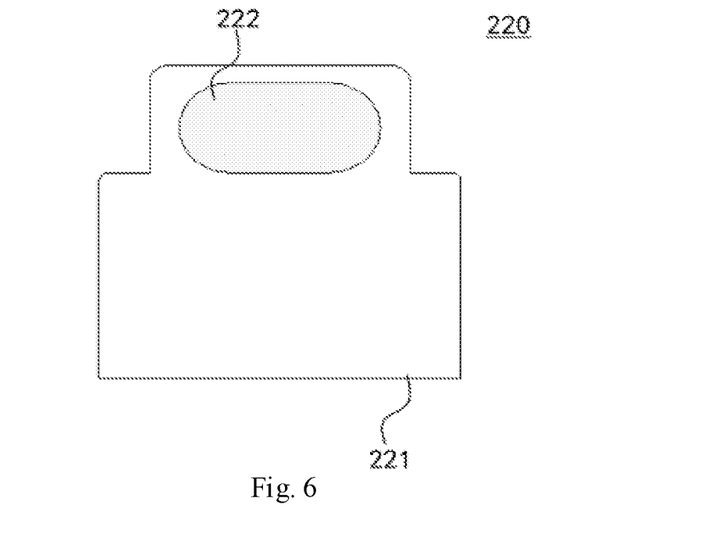
FIG. 6 is a schematic diagram illustrating a structure for the second support part and an LED light emitting element of the LED light strip as shown in FIG. 4.
Figure 7:
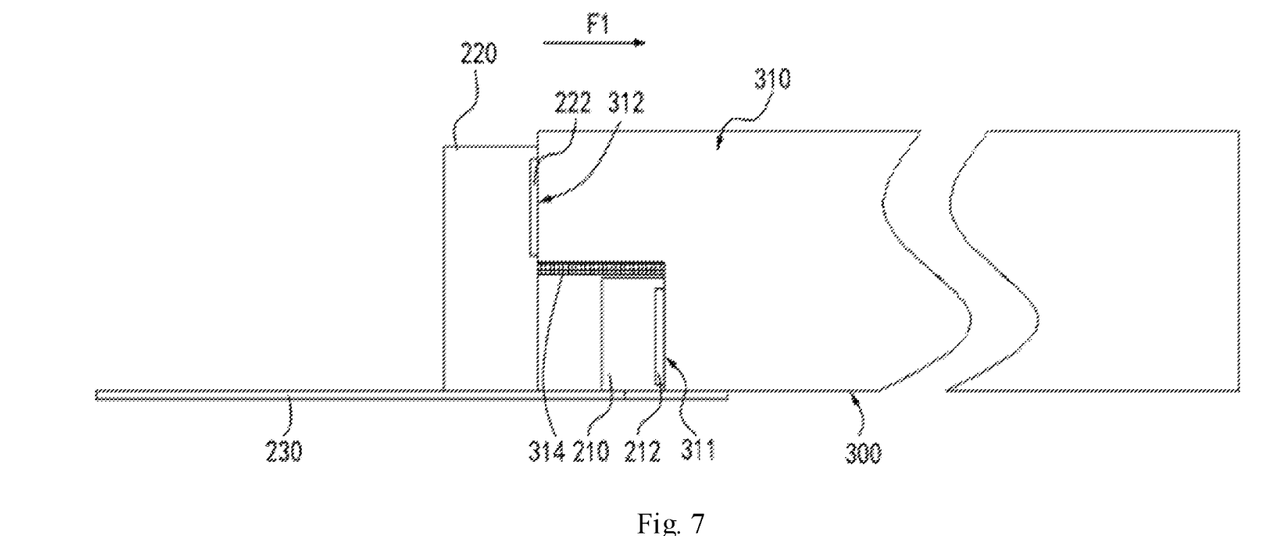
FIG. 7 is a schematic diagram illustrating a structure of a backlight module according to an exemplary embodiment.

As shown in FIG. 4, in the embodiment, the LED light strip 200 provide by the present disclosure includes a circuit board. Referring to FIGS. 5 to 7, FIG. 5 representatively shows a schematic diagram illustrating a structure for the first support part 210 and an LED light emitting element 212 of the LED light strip 200 and FIG. 6 representatively shows a schematic diagram illustrating a structure for the second support part 220 and an LED light emitting element 222 of the LED light strip 200. The detailed description will be given to the primary components of the LED light strip 200 provided by the present disclosure in conjunction with the above drawings.

As shown in FIGS. 4 to 6, in the embodiment, the circuit board may mainly include a board body 230 and a support structure and the support structure includes a plurality of support parts. The board body 230 is substantially in the shape of a strip plate and its arrangement is not limited to being in horizontal direction, vertical direction or in other ways. Specifically, the circuit board may be an existing flexible circuit board and the board body 230 is the wiring area of the flexible circuit board. The circuit board may also be other circuit boards applicable to the LED light strip 200. In other embodiment, the shape of the board body 230 is not limited to a strip and it can be flexibly adjusted according to the needs for the LED light strip 200.

As shown in FIGS. 4 to 6, in the embodiment, a plurality of support parts are disposed on a surface of the board body 230 and arranged in two rows (the said row is arranged and extended in the second direction F2 parallel to the board body). The support parts in each row are spaced apart from each other. For ease of description, a first direction F1 is defined to be parallel to the board body 230, which are preferably perpendicular to the second direction F2, that is, the first direction F1 can be construed as the light emitting direction of the light emitting surface of the LED light emitting element; and a relatively front row of the support parts in the first direction F1 is defined as the first row of the support parts and a relatively rear row of the support parts in the first direction F1 is defined as the second row of the support parts. Furthermore, the support parts in the first row are defined as the first support parts 210 and the support parts in the second row are defined as the second support parts 220. The first support parts 210 and the second support parts 220 are staggered from each other. Further, the support parts in each row may be evenly spaced and the present disclosure is not intended to limit thereto. In the present disclosure, the term "staggered" refers to a special relation between two objects having projections that are not overlapped with each other. In particular, the projections may be projected on the light exiting direction of the light strip.

As shown in FIGS. 4 to 6, in the embodiment, each first support part 210 is provided with an LED light emitting element 212, and the LED light emitting element 212 is disposed at a position on the first support part 210 that is toward the first direction F1. Similarly, as shown in FIG. 7, in the embodiment, each second support part 220 is provided with an LED light emitting element 222, and the LED light emitting element 222 is disposed at a position on the second support part 220 that is toward the first direction F1. That is to say, the LED light emitting elements on each row of the support parts face to the first direction. The height of the second support part 220 is higher than the height of the first support part 210, such that the LED light emitting element 222 disposed on the second support part 220 can be disposed on a position higher than the position where the first support part 210 is, so as to avoid the LED light emitting elements 222 in the rear row to be shielded by the first support part 210 in the front row. In addition. As shown in FIG. 5, in the embodiment, the first support part 210 may employ the existing structure of the circuit board or the similar design, the height of the second support part 220 can be increased with respective to the first support part 210 based on the existing structure, but it is not intended to limit thereto.

Through the above design of the present disclosure, when the support structure has two rows of support parts, the LED light emitting elements 212 on each first support part 210 and the LED light emitting elements 222 on each second support part 220 can be staggered from each other, and the increase in the number of rows of the LED light emitting elements and the support parts cannot affect luminous intensity and effect of the LED light strip 200. In other embodiments of the present disclosure, the arrangement of the support structure is not limited to two rows of supports, but may also be multiple rows of supports. That is, the plurality of support parts of the LED light strip 200 may be arranged in multiple rows, and the LED light emitting elements in each row of the support parts are staggered from each other through designing the arrangement of the rows of support parts. For example, in each row of support parts, the height of the LED light emitting elements in the relatively rear row in the first direction F1 is higher than the height of the LED light emitting elements in the relatively front adjacent row in the first direction F1. Through the above-mentioned design, the LED light emitting elements in each row of the support parts are orthographically projected on a plane parallel to the second direction F2 and perpendicular to the first direction F1, and the LED light emitting elements in different rows are staggered from each other in the height direction of the board body 230, so as to ensure full illumination of multiple rows of LED light emitting elements. It should be noted here that the LED light strip 200 shown in the drawings and described in this specification is only one example of a wide variety of LED light strips 200 that is consistent with the principles of the present disclosure. It should be clearly understood that the principle of the present disclosure is not limited only to any of the details of the LED light strips 200 shown in the drawings or described in this specification or any part of the LED light strips 200.

For example, based on the principle of the present disclosure, in another exemplary embodiment, when the support structure is arranged in two rows of support parts, the heights of the LED light emitting elements on the two rows of support members may not be considered, instead, the two rows of the support parts are staggered from each other, so that the LED light emitting elements are staggered from each other in a second direction F2 parallel to the board body 230 and perpendicular to the first direction F1. Accordingly, when the support parts are arranged in multiple rows, if the heights of the LED light emitting elements on the support parts in each row are not taken into consideration, the support parts in each row is staggered so as to ensure that the LED light emitting elements are staggered from each other, thereby achieving the purpose for enhancing the luminous intensity and effect.

Furthermore, when the support parts are arranged in multiple rows, the heights of the LED light emitting elements on the support parts in some of the rows may also be the same, and the heights of the LED light emitting elements on the support parts in other rows are different. For the rows where the LED light emitting elements having the same height are, the LED light emitting elements having the same height can be staggered from each other by the staggered arrangement. For the rows where the LED light emitting elements having different heights are, the LED light emitting elements having different heights can be staggered from each other based on the difference in height. Further, in addition to the difference in height, the staggered arrangement can also be combined to ensure that the LED light emitting elements having different heights can be staggered from each other, and the present disclosure is not intended to limit thereto.

In combination with the design concept of the previous embodiments of the LED light strip, another exemplary embodiment of the LED light strip provided by the present disclosure is described below.

In the embodiment, based on a design that each first support part in the front row and each second support part in the rear row correspond to each other one to one, the first support part and the second support part that correspond to each other may be designed as an integrated stepped structure. That is, in the embodiment, the support structure includes a plurality of stepped structures that are spaced apart in the second direction. Each stepped structure includes a plurality of arrangement surfaces (the arrangement surface is the elevation of the stepped structure when the board body is defined as the horizontal reference surface, and the stepped structure is a structure with two stages if there are two arrangement surfaces and the stepped structure is a structure with multiple stages if there are multiple arrangement surfaces), and each arrangement surface is provided with an LED light emitting element. Accordingly, a plurality of LED light emitting elements are arranged in a plurality of rows, and the height of the arrangement surface that is relatively rear in the first direction is higher than the height of the arrangement surface that is relatively front, that is, the height of the LED light emitting elements in the rear row is higher than the height of the LED light emitting elements in the front row, so as to achieve the effect for staggering the LED light emitting elements and ensure the luminous intensity.

In combination with the design concept of the previous embodiments of the LED light strip, still another exemplary embodiment of the LED light strip provided by the present disclosure is described below.

In this embodiment, the support structure is an integrated stepped structure, which can also be understood as connecting the above described stepped structures in the second embodiment together in the second direction to form the stepped support structure that extends in the second direction. The support structure is provided with a plurality of arrangement surfaces perpendicular to the board body and the first direction and extending in the second direction. Each arrangement surface is provided with LED light emitting elements arranged in rows, and the arrangement direction of the rows on the arrangement surface is parallel to the second direction. Based on the structural characteristics of the stepped structure, the height of the relatively rear arrangement surface in the first direction is higher than the height of the relatively front arrangement surface, so that the LED light emitting elements in each row are staggered and the luminous intensity is ensured. In addition, in the embodiment, since the support structure adopts the above-mentioned integral structure, the manufacturing process of the present disclosure is simplified, the manufacturing cost is reduced, and the production efficiency is improved.

Based on the above description of several exemplary embodiments of the LED light strip provided by the present disclosure, LED light emitting elements are arranged in multiple rows on a support structure, and LED light emitting elements are designed such that their orthographic projections are staggered from each other on the plane parallel to the second direction and perpendicular to the first direction, such that shielding issue that occurs when multiple rows of LED light emitting elements are arranged can be avoided and the significantly increased brightness can be ensured while satisfying with the requirement for lightening the structure.

Referring to FIG. 7, FIG. 7 representatively shows a top view illustrating a backlight module that can embody the principle of the present disclosure. In the embodiment, the backlight module mainly includes an LED light strip 200 and a light guide plate 300. The LED light strip 200 is the LED light strip 200 provided by the present disclosure, and the light guide plate 300 is disposed on a surface of the circuit board body 230 of the LED light strip 200 that is disposed with a support structure, and the light guide plate 300 has a light incident side 310 which is provided with two light guide surfaces. This two light guide surfaces cooperate with the LED light emitting element on the support parts in the two rows.

As shown in FIG. 7, in the embodiment, since the plurality of the support parts of the LED light strip 200 is arranged in two rows, in order to achieve the cooperation with the LED light strip 200, the light incident side 310 of the light guide plate 300 is provided with a first light guide surface 311 and a second light guide surface 312, and the first light guide surface 311 corresponds to the LED light emitting elements 212 disposed on the first support parts 210 and the second light guide surface 312 corresponds to the LED light emitting elements 222 disposed on the second support parts 220. Specifically, in the embodiment, in order to form the above first light guide surface 311 and the above second light guide surface 312 on the light incident side 310 of the light guide plate 300, the light incident side 310 of the light guide plate 300 is disposed with a stepped groove 313. This stepped groove 313 is disposed on the lower portion of the light incident side 310 and has a top and a side wall. The first light guide surface 311 is formed by the side wall and corresponds to the LED light emitting elements 212 disposed on the first support part 210, and the side wall on the upper portion of the light incident side 31 is formed as the second light guide surface 312 which corresponds to the LED light emitting elements 222 disposed on the second support parts 220.

Furthermore, as shown in FIG. 7, in the embodiment, in order to further avoid the leakage of light to further improve the brightness, a reflection sheet 314 is provided between the first light guide surface 311 and the second light guide surface 312, that is, the reflection sheet 314 is located on top of the groove 313.

In addition, in other embodiments of the present disclosure, when the support structure is arranged in multiple rows (two or more rows) of support members, the structure of the groove disposed on the light incident side of the light guide plate may be further optimized to cooperate the light guide plate with the plurality of the rows of the support parts. For example, when the heights of the rows of support parts are different, the aforementioned groove on the light incident side of the light guide plate can be designed as a multi-step structure, thereby forming a plurality of light guide surfaces corresponding to the LED light emitting elements disposed on the support parts in each row. For another example, when the support parts in the rows have the same height and are staggered, the light incident side of the light guide plate can be designed as a zigzag-like structure so as to form a plurality of the light guide surfaces corresponding to the LED light emitting elements disposed on the support members in each row, and the height of these light guide surfaces are the same with respective to the plane of the board body 230.

To sum up, the present disclosure provides an LED light strip and a backlight module having the same. By disposing multiple rows of LED light-emitting elements that are staggered from each other on the LED light strip and designing each row of LED light-emitting elements as a structure or an arrangement with different heights and/or a staggering structure or a staggering arrangement, the luminance of an LED device may be increased significantly while lightening the LED device. In addition, in the backlight module provided by the present invention, mutual matching of the backlight module with the other LED light strips can be realized through the design of the light guide plate, thereby the luminance of the backlight module can be improved and the HOT SPOT issue can be improved effectively.

Exemplary embodiments of the LED light strip and a backlight module having the LED light strip provided by the present disclosure are described and/or illustrated in detail above. However, embodiments of the present disclosure are not limited to the specific embodiments described herein, but rather, components and/or steps in each embodiment may be used independently and separately from other components and/or steps described herein. Each component and/or step in one embodiment may also be used in combination with other components and/or steps in other embodiments. When introducing elements/components described and/or illustrated herein, the terms "a", "an", "the" or the like are used to indicate the presence of one or more elements/components. The terms "comprising", "including" and "having" are intended to denote a meaning of an open-ended inclusion and mean that there may be additional elements/components other than the listed elements/components. Furthermore, the terms "first", "second" or the like in the claims and the description are used only as labels, but not as a numerical limitation on their objects.

As can be seen from the above technical solutions, the LED light strip and the backlight module having the same provided by the present disclosure have the following advantages and positive effect.

In the LED light strip and the backlight module having the same provided by the present disclosure, by disposing a plurality of rows of the LED light emitting elements on the LED light strip and designing the rows of the LED light emitting elements as a structure or an arrangement with different heights and/or a staggering structure or a staggering arrangement, the luminance of an LED device may be increased significantly while lightening the LED device. In addition, in the backlight module provided by the present disclosure, mutually matching of the light guide plate with the LED light strip can be realized by the design of the light guide plate, thereby, the luminance of the backlight module can be improved and the HOT SPOT issue can be improved effectively.

Although the LED light strip and the backlight module having the same provided by the present disclosure have been described according to different specific embodiments, those skilled in the art will recognize that the modifications to the embodiments of the present disclosure can be made within the spirit and scope of claims.

What is claimed is:

1. An LED light strip, comprising a circuit board, wherein the circuit board comprises a board body and a support structure disposed on a surface of the board body,
a plurality of LED light emitting elements are disposed on the support structure, the plurality of the LED light emitting elements are arranged in a plurality of rows and face to a first direction parallel to the board body;
an arrangement direction of each row of the LED light emitting elements is a second direction that is parallel to the board body and perpendicular to the first direction, and
orthographic projections of the LED light emitting elements on a plane that is parallel to the second direction and perpendicular to the first direction are staggered from each other,
wherein, for two adjacent rows of the LED light emitting elements among the plurality of the rows of the LED light emitting elements a height of the LED light emitting elements in a relatively rear row in the first direction is higher than a height of the LED light emitting elements in a relatively front row in the first direction, and
wherein the support structure is arranged in a stepped shape and is disposed with a plurality of arrangement surfaces that are perpendicular to the board body and the first direction,
each arrangement surface is disposed with at least one row of the LED light emitting elements, and
the height of the relatively rear arrangement surface in the first direction is higher than the height of the arrangement surface in the relatively front adjacent tow in the first direction.

2. The LED light strip according to claim 1, wherein the support structure comprises a plurality of support parts disposed on the board body and arranged in a plurality of rows, each support part is provided with at least one LED light emitting element;
a height of the support parts in the relatively rear row in the first direction is higher than a height of the support parts in the relatively front adjacent row in the first direction; and
the height of the LED light emitting elements disposed on the support parts in the higher row is higher than the height of the support parts in the adjacent lower row.

3. The LED light strip according to claim 2, wherein the support parts in each row are evenly spaced in the second direction.

4. The LED light strip according to claim 1, wherein the LED light emitting elements on each arrangement surface are evenly spaced in the second direction.

5. A backlight module, comprising a light guide plate and an LED light strip disposed on a light incident side of the light guide plate, wherein the LED light strip comprises a circuit board,
the circuit board has a board body and a support structure disposed on a surface of the board body,
a plurality of LED light emitting elements are disposed on the support structure, the plurality of the LED light emitting elements are arranged in a plurality of rows and face to a first direction parallel to the board body,
an arrangement direction of each row of the LED light emitting elements is a second direction that is parallel to the board body and perpendicular to the first direction, and
orthographic projections of the LED light emitting elements on a plane that is parallel to the second direction and perpendicular to the first direction are staggered from each other,
and wherein the light incident side of the light guide plate corresponds to a plurality of rows of the LED light emitting elements of the LED light strip,
wherein, for two adjacent rows of the LED light emitting elements among the plurality of the rows of the LED light emitting elements among the plurality of the rows of the LED light emitting elements, a height of the LED light emitting elements in a relatively rear row in the first direction is higher than a height of the LED light emitting elements in a relatively front row in the first direction, and
wherein the support structure is arranged in a stepped shape and is disposed with a plurality of arrangement surfaces that are perpendicular to the board body and the first direction,
each arrangement surface is disposed with at least one row of the LED light emitting elements, and
the height of the relatively rear arrangement surface in the first direction is higher than the height of the arrangement surface in the relatively front adjacent tow in the first direction.

6. The backlight module according to claim 5, wherein the LED light emitting elements are arranged in two rows, a height of the LED light emitting elements in a relatively rear row in the first direction is higher than a height of the LED light emitting elements in a relatively front row in the first direction; and
wherein the light incident side of the light guide plate is disposed with a stepped groove and two light guide surfaces, and the two light guide surfaces correspond to and cooperate with the two rows of the LED light emitting elements respectively.

7. The backlight module according to claim 6, wherein a reflection sheet is provided between the two light guide surfaces and the reflection sheet is located on top of the groove.

8. The backlight module according to claim 5, wherein the support structure comprises a plurality of support parts disposed on the board body and arranged in a plurality of rows, each support part is provided with at least one LED light emitting element;
a height of the support parts in the relatively rear row in the first direction is higher than a height of the support parts in the relatively front adjacent row in the first direction; and
the height of the LED light emitting elements disposed on the support parts in the higher row is higher than the height of the support parts in the adjacent lower row.

9. The backlight module according to claim 8, wherein the support parts in each row are evenly spaced in the second direction.

10. The backlight module according to claim 5, wherein the light incident side of the light guide plate is disposed with a plurality of light guide surfaces corresponding to and cooperating with the plurality of the rows of the LED light emitting elements respectively.

11. The backlight module according to claim 5, wherein the LED light emitting elements on each arrangement surface are evenly spaced in the second direction.

* * * * *